Dec. 24, 1963 A. H. W. BECK ETAL 3,115,623

DECODING ARRANGEMENTS FOR ELECTRIC PULSE CODE MODULATION SYSTEMS

Filed April 8, 1959 2 Sheets-Sheet 1

*Inventors:*
A.H.W.Beck-A.T.Starr-
T.H.Walker
*By* [signature]
*Attorney*

*Inventors*
A.H.W.Beck-A.T.Starr
T.H.Walker
*By* [signature]
*Attorney*

United States Patent Office 3,115,623
Patented Dec. 24, 1963

3,115,623
DECODING ARRANGEMENTS FOR ELECTRIC PULSE CODE MODULATION SYSTEMS

Arnold Hugh William Beck, Arthur Tisso Starr, and Thomas Harold Walker, London, England, assignors to International Standard Electric Corporation, New York, N.Y.
Filed Apr. 8, 1959, Ser. No. 805,035
Claims priority, application Great Britain Apr. 18, 1958
12 Claims. (Cl. 340—347)

The present invention relates to decoding arrangements for electric pulse code modulation systems.

In the case of communication systems employing a very wide frequency band, such as systems intended for operation over long-distance wave-guides, it is believed at the present time that transmission by pulse code modulation is likely to be most suitable. In order to employ the whole frequency band economically it is necessary that the pulse code modulation system should provide a very large number of channels and this is only possible if, among other things, very rapidly operating decoding arrangements can be employed.

The present invention contributes to the solution of this problem by means of a cathode ray tube device. Various coding and decoding arrangements employing such tubes are already well known, but the invention employs the tube in a novel manner which enables the decoding speed to be increased. The principle of the invention is that the cathode ray tube is provided with one decoding element for each level represented by the code. Thus in the case of a binary code of $p$ digits there will be $2^p$ decoding elements in the tube.

The invention accordingly provides a decoding arrangement for an electric pulse code modulation communication system employing a digit pulse code adapted to represent $m$ different amplitude levels of a signal wave, comprising a cathode ray tube having an assembly of $m$ decoding elements corresponding respectively to the said amplitude levels, means controlled by the digit pulse combination representing any given level for directing the electron beam on to the decoding element corresponding to the given level, and means for deriving from the last-mentioned decoding element an output voltage or current representing the given level.

While binary codes are most commonly used in pulse code modulation systems, the invention is applicable without any modification in principle to systems employing other than binary codes.

The invention will be described with reference to the accompanying drawings, in which.

In order to illustrate the invention, it will be first assumed that a six-digit binary code is to be used, and that all the digit pulses or voltages corresponding to each character appear simultaneously on six respective separate digit conductors. If, as is frequently the case, the digit pulses corresponding to each character are actually transmitted in sequence, a suitable distributor, for example employing a delay line, may be used in known manner to rearrange the digit pulses so that they appear simultaneously on separate conductors.

The digits of the code will be numbered in order from 1 to 6, digit 1 being the least significant digit. This code is capable of representing 64 different amplitude values or levels of the signal wave to be conveyed over the system.

Figure 1:
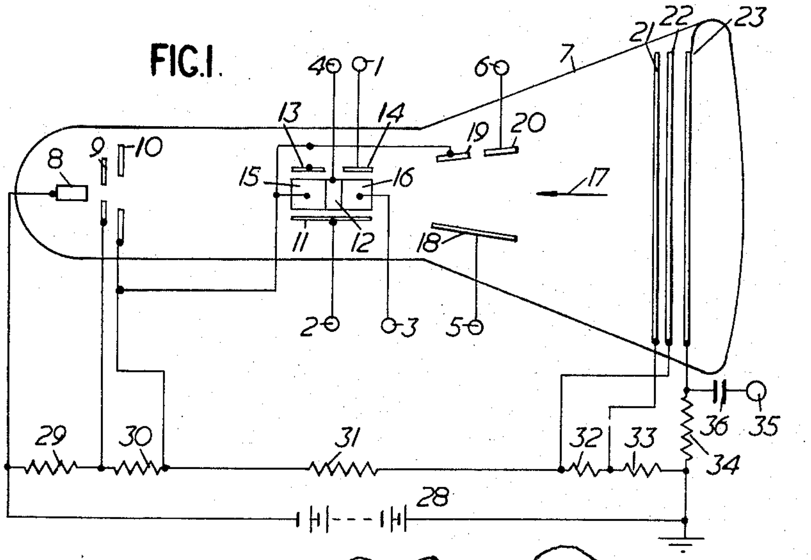
FIG. 1 shows a diagram of a decoding arrangement according to the invention employing a cathode ray tube.

FIG. 1 shows diagrammatically a side elevation of one form of a cathode ray tube designed for decoding a six-digit code. The figure does not indicate any constructional details, but shows the approximate relative positions of the various electrodes inside the envelope. The mounting of these electrodes may be carried out according to conventional practice.

In FIG. 1, six terminals numbered 1 to 6 are shown connected to deflecting plates of the cathode ray tube 7, and the digit 1 to 6 pulses will be supplied respectively to these terminals. The tube 7 comprises the usual cathode 8 and electrodes 9, 10 conventionally arranged for generating a narrow electron beam and projecting it along the axis of the tube. The electron beam passes through two successive groups of deflecting plates. The first group comprises six plates, of which two, namely 11 and 12 are connected to terminals 2 and 4, respectively, and are relatively long and narrow, and are set mutually at right angles. Two smaller plates 13 and 14, which are rather less than half the length of the plates 11 and 12 are arranged parallel to the plate 11. The plate 13, which is nearer to the cathode 8, is connected to electrode 10, and the other plate 14 is connected to terminal 1. Two further small plates 15 and 16 similar to 13 and 14 are arranged parallel to the long plate 12, and obscure it in the view shown in FIG. 1, so that only the central part of the plate 12 can be seen. The plate 15, which is nearer to the cathode 8, is connected to the electrode 10, and the other plate 16 is connected to terminal 3.

Figures 2, 3:
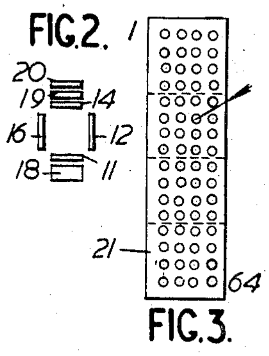
FIGS. 2, 3 and 4 show details of FIG. 1.

The six plates of this group form a square assembly, as can be seen from FIG. 2, which is the view seen in the direction of the arrow 17 in FIG. 1.

The group of plates 11 to 16 can be regarded as substantially equivalent to two successive sets of conventional deflecting plates each of which provides two deflections of the beam at right angles, in which two adjacent plates of one set are connected respectively to the two corresponding adjacent plates of the other set.

The second group of plates comprises three plates, namely a relatively long plate 18 and opposite to it two short plates 19 and 20. These plates are arranged similarly to the plates 11, 13 and 14, except that they are slightly splayed outwards, as indicated, to avoid intercepting the electron beam when it has the maximum upward or downward deflection. The large plate 18 is connected to terminal 5 and the small plate 19 which is nearer to the cathode 8 is connected to electrode 10. The other small plate 20 is connected to terminal 6.

At the large end of the cathode ray tube 7 remote from the cathode 8, are arranged three parallel metal plates 21, 22, 23, one behind the other. Plate 23 is a plain flat target plate, and plate 21 is a screen plate and is provided with 64 similar circular holes arranged in four vertical lines of 16 holes, each hole being equally spaced from its neighbors, as shown in the plan view, FIG. 3. The diameter of each hole should be sufficient to allow the whole of the electron beam to pass through when it is deflected to that hole.

The plate 22 which is arranged behind the plate 21, will be called the "perveance" plate, and comprises 64 holes arranged in the same way as the holes in the plate 21, as shown in FIG. 3. Each of the holes in the plate 22 is covered by a mesh grid, the grids being so designed that the grid covering each hole has a different "perveance."

The term "perveance" is usually applied to the constant $p$ in the diode equation.

$$I=pV_a^{3/2}$$

in which $V_a$ is the difference of potential between the anode and cathode, and I is the corresponding anode current. A similar equation holds approximately for a triode, namely:

$$I=P(V_a+\mu V_g)^{3/2}$$

where $V_g$ is the difference of potential between the grid and the cathode, assumed to be small, and $\mu$ is the amplification factor. The constant P depends on $\mu$ and on the electrode spacing, and thus on the grid design, and for convenience the constant P will be referred to as the "perveance" of the grid. The formula for P can be derived from Equation 41 of Chapter 9 of the textbook "Thermionic Valves" by A. H. W. Beck published by the Cambridge University Press, 1953, and from this the design of a grid having a given perveance can be derived by those skilled in the art. In applying the above formula, the plate 21 would be regarded as the cathode and the target plate 23 as the anode of the equivalent triode, of which one of the grids carried by plate 22 is the grid.

Figure 4:
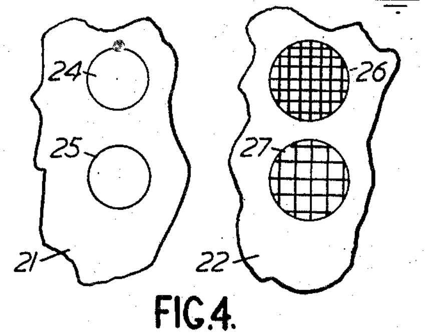

In FIG. 4 are shown to a large scale small portions of the plates 21 and 22. The portion of the plate 21 shows two of the holes 24, 25 and that of plate 22 shows the two corresponding holes covered with grids 26 and 27 of different mesh. The plates 21 and 22 are so placed that the grids 26, 27 are axially behind the corresponding holes 24, 25 so that if the electron beam passes through one of the holes in the plate 21 it strikes the corresponding grid carried by the plate 22.

Plate 23 is a collector plate which collects the electrons which pass through any of the grids in the plate 22.

The cathode ray tube 7 is operated from a direct current source 28 of any suitable type and voltage, with its positive terminal connected to ground. The negative terminal of this source is connected to the cathode 8, and a chain of resistors 29 to 33 is connected in series across the source 28 to provide a potential divider from which is obtained suitable potentials for the elements 9, 10, 21, 22 and 23 as indicated. Any other suitable conventional means may be used to polarize these elements. The plate 23 is connected to the positive terminal of the source 28 through a load resistor 34, and to an output terminal 35 through a blocking capacitor 36. It will be noted that the plate 22 is polarized negatively to the plate 21, and as already explained, the number of electrons which reach the collecting plate 23 depends on the perveance of the grid through which the electron beam has passed, and so the output voltage at terminal 35 depends on the particular hole in the plate 21 through which the beam is deflected, and will be different for each hole.

The manner in which the deflection of the electron beam is controlled by the digit pulses will now be explained. It will be assumed that when any one of the six digit pulses is present, a fixed voltage $+v$ is applied to the corresponding one of the terminals 1 to 6 of FIG. 1, $+v$ being the same for all digit pulses, and that when any digit pulse is absent, the voltage applied to corresponding terminal is zero. When no digit pulses are present, all the deflecting plates are at or near zero potential since resistors 31, 32 and 33 are in practice small compared with resistors 29 and 30 and there will be very little deflection of the beam, so that it will strike the screen plate 21 somewhere near the centre.

The holes in the plate 21 are arranged as shown in FIG. 3, and will be considered as grouped into four equal square blocks of 16 holes as indicated by the dotted lines. For convenience, the holes will be also considered to be numbered from 1 to 64 in horizontal rows starting from the top left-hand corner. Assuming that FIG. 3 shows the face of the plate 21 which is struck by the electron beam, the plates 21 and 22 are adjusted so that when no digit pulses are present, the beam passes through hole No. 23 in the second block of holes from the top, as indicated by the arrow. Alternatively, the plates 21 and 22 may be arranged centrally in the tube, and the beam may be biassed by suitable bias potentials applied to plates 14 and 16, for example, by conventional means not shown, so that it passes through hole No. 23, when no digit pulses are present. The biassing of these plates could, for example be arranged in the manner illustrated in FIG. 5.

It will be first assumed that digit 5 and 6 pulses are not present, so that the group of plates 18, 19, 20 have no effect on the beam. Then the plates 11 and 13 are so dimensioned that when a digit 2 pulse is present alone, so that a voltage $+v$ is applied to plate 11, the beam is deflected downwards by a distance $2d$ on the plate 21, where $d$ is the distance between the centres of any two adjacent holes in the plate 21. Plate 14 is dimensioned so that when a digit 1 pulse is present alone, and a voltage $+v$ is applied to plate 14, the beam is deflected upwards by a distance $d$. Thus if digit 1 and digit 2 pulses are simultaneously present, the beam will be deflected downwards by a distance $d$. It follows that the electron beam will be deflected through one of the four holes Nos. 19, 23, 27 and 31 in the third column of the second block, according to the presence or absence of the digit 1 and 2 pulses.

The plates 12, 15 and 16 are dimensioned in exactly the same way as plates 11, 13 and 14, so that if one or both of digit 3 and 4 pulses is or are present, without digit 1 and 2 pulses, the electron beam will be deflected through one of the four holes Nos. 21, 22, 23 and 24 in the sixth row from the top in FIG. 3.

It will now be evident, that according to the presence or absence of any one or more of the first four digit pulses, the beam will be deflected through a corresponding one of the sixteen holes in the escond block from the top of FIG. 3, according to the following Table I, in which "0" indicates the absence of a digit pulse, and "1" indicates its presence. In the case of the ordinary, binary code, these sixteen holes correspond to the first sixteen amplitude levels of the signal wave.

*Table I*

| Digit Pulse | | | | Hole No. | Level No. | Digit Pulse | | | | Hole No. | Level No. |
|---|---|---|---|---|---|---|---|---|---|---|---|
| 1 | 2 | 3 | 4 | | | 1 | 2 | 3 | 4 | | |
| 0 | 0 | 0 | 0 | 23 | 1 | 0 | 0 | 0 | 1 | 21 | 9 |
| 1 | 0 | 0 | 0 | 19 | 2 | 1 | 0 | 0 | 1 | 17 | 10 |
| 0 | 1 | 0 | 0 | 31 | 3 | 0 | 1 | 0 | 1 | 29 | 11 |
| 1 | 1 | 0 | 0 | 27 | 4 | 1 | 1 | 0 | 1 | 25 | 12 |
| 0 | 0 | 1 | 0 | 24 | 5 | 0 | 0 | 1 | 1 | 22 | 13 |
| 1 | 0 | 1 | 0 | 20 | 6 | 1 | 0 | 1 | 1 | 18 | 14 |
| 0 | 1 | 1 | 0 | 32 | 7 | 0 | 1 | 1 | 1 | 30 | 15 |
| 1 | 1 | 1 | 0 | 28 | 8 | 1 | 1 | 1 | 1 | 26 | 16 |

Thus it will be seen that the first four digit pulses deal with a square block of sixteen holes. By means of digit 5 and 6 pulses, and the plates 18 to 20, the particular one of the four blocks in FIG. 3 is selected, thus covering the remaining 48 levels in the case of the ordinary binary code. The plates 18 and 19 are dimensioned so that when the digit 5 pulse is present alone, and a voltage $+v$ is applied to plate 18, the beam is deflected downwards on the plate 21 by a distance equal to $8d$. The plate 20 is dimensioned so that when the digit 6 pulse is present alone, the beam is deflected upwards on the plate 21 by a distance $4d$. It follows that if the digit 5 pulse is present, the holes Nos. 49 to 64 are covered; if digit 6 pulse is present, the holes Nos. 1 to 16 are covered; and if both are present, the holes Nos. 33 to 48 are covered.

Thus to every code combination of the six digit pulses corresponds one, and only one, of the 64 decoding elements, each of which comprises a hole in the plate 21 and the corresponding grid in the plate 22. Each code combination represents a particular one of 64 amplitude values of the signal wave, and so the grid which lies behind the hole selected by the combination is designed to have a perveance such that the voltage developed across the resistor 34 by the electrons collected by the plate 23 is proportional to the amplitude value represented by the code combination.

It will be noted that with this method of decoding, it is immaterial what variety of the binary code is used, because the grids can be arranged on the plate equally easily in any order necessary to suit the code. In particular, the cyclic permutation code can be decoded without the necessity for first translating it into the common form of the binary code.

It will be clear that in response to a succession of code combinations of digit pulses there will be obtained from terminal 35 (FIG. 1) a train of pulses whose amplitudes are proportional to corresponding samples of the signal wave, and the latter may be reproduced by passing the pulses through a low-pass filter (not shown) according to conventional practice.

It should be pointed out that if amplitude compression has been applied before or during coding in the transmitter, the necessary expansion during decoding is easily obtained by suitable proportioning of the perveance of the various grids.

A number of minor variations of the arrangements which have been described are possible. For example, although it has been assumed that the presence of a digit pulse causes the same voltage $+v$ to be applied to the corresponding terminal for all the digit pulses, it may be convenient for simplifying the design of the deflecting plates, to arrange in any suitable way that the digit pulses applied to terminals 1 to 6 have various amplitudes which, in combination with the dimensions and spacing of the deflecting plates, produce on the surface of the plate 21 the deflections specified above.

The graduating or weighting of the voltage output from the collector plate 23 can be arranged in a different way. For example, the plate 22 can be made of insulating material and can carry 64 identical grids, all with the same perveance, but each provided with a different bias voltage of the proper value to produce the necessary output voltage at terminal 35. The different bias voltages could, for example, be obtained by providing the resistor 32 with 64 suitable tapping points, one connected to each grid. While this arrangement is simpler as regards the grid design, it requires 64 separate connections to the plate 22 which must be sealed through the envelope, instead of only one. A compromise arrangement would be to have, say, eight similar series of eight grids, the grids of each series having different values of perveance, each series of grids being differently biassed. This would require only eight separate connections to the plate 22 and eight bias voltages, but the arrangement might be more difficult to adapt for expansion than either of the others. In general, there could be $n$ different values of perveance, combined with $64/n$ different bias potentials, where $n=1$, 2, 4, 8, 16, 32 or 64.

The arrangement which has been described is intended for a six-digit code, but it will be obvious that it can be modified for other numbers of digits. For example, if the plates 18, 19 and 20 are omitted, the arrangement provides for a four-digit code. If plate 20 is omitted and plate 18 is reduced to about half its length, a five-digit code is provided for. If three more plates similar to 18, 19 and 20 are added to the second group so that the arrangement is similar to the first group of plates 11 to 16, except for the outward splay, an eight-digit code can be provided for. In this case, of course, the plates 21, 22 and 23 will be square, and there will be a total of 256 holes in the plate 21.

Figure 5:
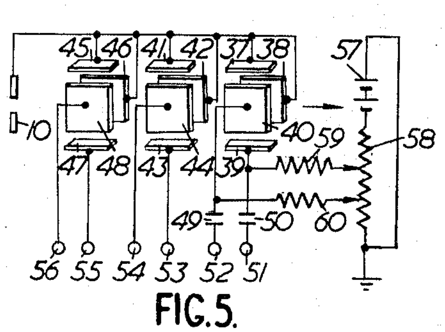
FIGS. 5 and 6 show modifications of parts of FIG. 1.
Figure 6:
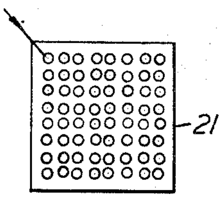

A different arrangement of the deflecting plates of the cathode ray tube 7 is shown in FIG. 5. Only the deflecting plates of the tube are shown in perspective in FIG. 5, and also the electrode 10, and it will be understood that the tube may be in other respects as described with reference to FIG. 1. However, in the case of a six-digit code, the 64 holes in the screen plate 21 and the corresponding grids in the perveance plate 22 are arranged in a square as shown in FIG. 6.

FIG. 5 shows three successive groups each comprising four deflecting plates, each group being arranged in a square in the conventional way to produce two mutually perpendicular deflections of the electron beam. The spacing of the groups and the dimensions of the plates have to be suitably chosen as will be explained below. The beam is supposed to be travelling through the groups of plates in the direction of the arrow, and to strike the face of the plate 21 which is shown in FIG. 6.

The deflecting plates of the three groups are numbered respectively 37 to 40; 41 to 44; and 45 to 48; as shown.

The upper and rear plates of each group namely 37, 38; 41, 42; and 45, 46 are all connected to electrode 10. The lower and front plates 39 and 40 are connected through respective blocking capacitors 49, 50 to terminals 51, 52 for the digit 1 and digit 2 pulses. The plates 43, 44, 47 and 48 are respectively connected to terminals 53, 54, 55 and 56 for the digits 3 to 6 pulses, respectively.

It will be assumed, as before, that when any digit pulse is present, a fixed voltage $+v$ is applied to the corresponding terminal, and when no digit pulse is present the applied voltage is zero. When, therefore, no digit pulses are present, the electron beam will be practically undeflected, and assuming that the plate 21 is symmetrically placed in the tube, the beam will strike it near the centre. However, it is clear that the odd numbered digit pulses always produce downward deflections of the beam on the plate 21 (as seen in FIG. 6) and even-numbered digits produce deflections to the right. It is therefore necessary to bias the beam so that when no digit pulses are present it passes through the hole indicated by the arrow in the upper left-hand corner of the plate 21 as seen in FIG. 6. This may be done, for example, but providing a bias source 57 (FIG. 5) with its positive terminal connected to ground, and its negative terminal connected to ground through a potentiometer 58 with two adjustable contacts. These contacts are connected to plates 39 and 40 through resistors 59 and 60. By adjustment of these contacts it will clearly be possible to cause the beam to pass through the hole indicated by the arrow. The capacitors 49 and 50 prevent direct current from the source 57 from reaching the source of the digit pulses.

It will be understood that any other convenient biasing arrangement may be used.

The first group of deflecting plates 37 to 40 (that is, that furthest from the cathode) is designed so that when a digit 1 (or digit 2) pulse is present alone, the point at which the beam strikes the plate 21 is shifted downwards (or to the right) by a distance $d$, the distance between any two adjacent holes. The second group of plates 41 to 44 is designed so that when a digit 3 (or digit 4) pulse is present alone, the point at which the beam strikes the plate 21 is shifted downwards (or to the right) by a distance $2d$; and the third group of plates 45 to 48 is designed so that when a digit 5 (or digit 6) pulse is present alone, the point at which the beam strikes the plate 21 is shifted downwards (or to the right) by a distance $4d$.

It will be evident that the digit 1 and 2 pulses select a particular hole of a square group of 4 holes; that the digit 3 and 4 pulses select a particular square group of holes from a square supergroup of four square groups; and that the digit 5 and 6 pulses select a particular square supergroup from the four supergroups which comprise the 64 holes in the plate 21 shown in FIG. 6. It follows that a different hole coresponds to each of the 64 code combinations of the six digit pulses.

The plate 22 (FIG. 1) has 64 grids arranged in a square formation in the same way as the holes in plate 21 (FIG. 6), each grid having a different perveance. The grids are so distributed over the plate 21 that the perveance of each grid has the value appropriate to the corresponding code combination, as explained with reference to FIG. 1.

Alternatively, all grids may have the same perveance but with a different bias potential for each grid; or grids with $n$ different values of perveance in combination with $64/n$ different bias potentials may be used, as described with reference to FIG. 1.

It will be understood that in order to fulfill the conditions for the design of the deflecting plates in FIG. 5, the three groups of plates need not be similar in dimensions, and need not be equally spaced. As mentioned in connection with FIG. 1, the respective digit pulses can be arranged to be of different amplitudes if this should result in a more convenient design for the sets of deflecting plates.

It is evident that, if desired, the biasing arrangements shown in FIG. 5 could be omitted if the plate 21 is arranged unsymmetrically in the tube 7 so that the undeflected electron beam passes through the hole designated by the arrow in FIG. 6, but this is likely to be an unsuitable arrangement.

It will be clear that the arrangement described with reference to FIG. 6 also has the property that it is easily adaptable to any form of the binary code, and the application of expansion causes no complication.

It is obvious that the arrangement shown in FIGS. 5 and 6 is adaptable for a code with any number of digits. For example if the plates 46 and 48 are omitted, the arrangement is suitable for a five-digit code, and the plate 21 will be provided with only the first four left-hand columns of holes. If an additional group of four deflecting plates (not shown) is provided, an eight-digit code can be accommodated, and the plate 21 will then have 256 holes arranged in a square.

Although the grids illustrated in FIG. 4 are mesh grids, it will be understood that grids of other forms, such as annular grids, could be used. It would also be possible to provide the desired values of perveance by dispensing with any grids and giving the holes in the plate 22 various diameters, so that various proportions of the beam electrons are intercepted.

Figures 7, 8:
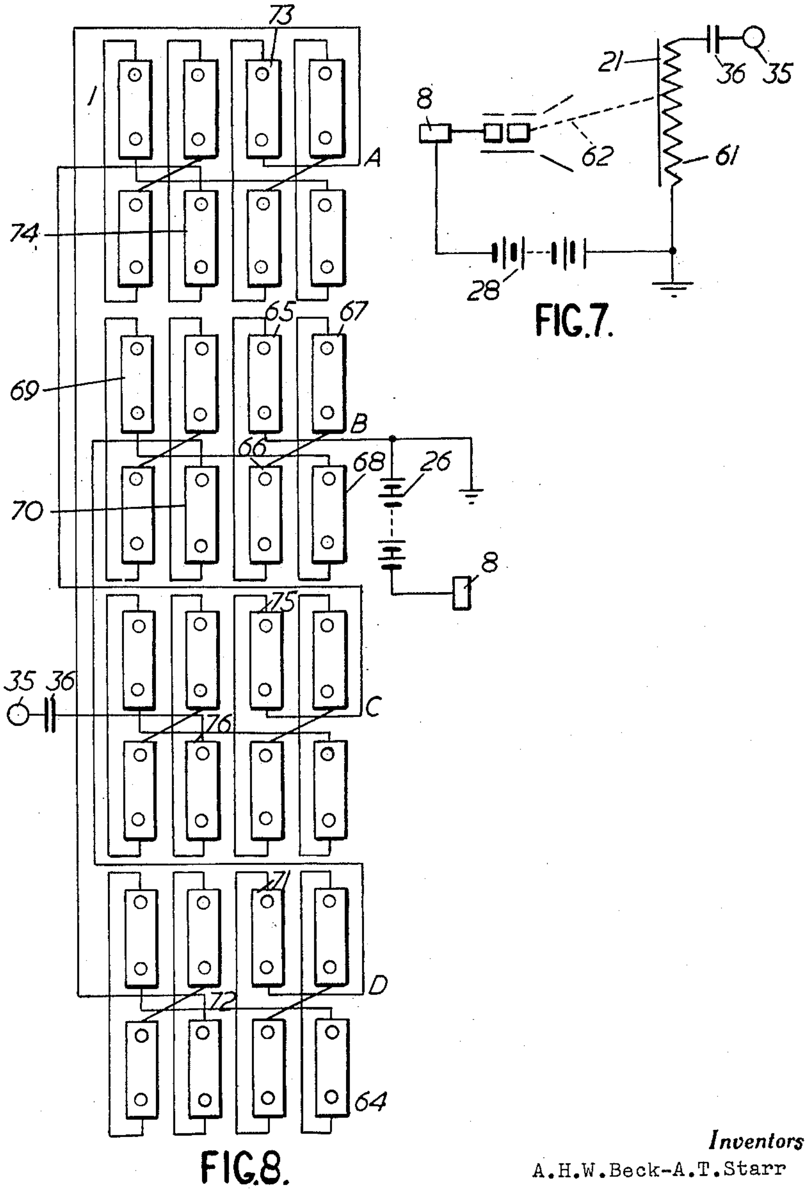
FIG. 7 shows a skeleton circuit to illustrate another modification of FIG. 1.
FIG. 8 shows details of the modification illustrated in FIG. 7.

FIG. 7 shows a skeleton circuit to illustrate an alternative method of weighting the output from the cathode ray tube (FIG. 1). In FIG. 7 the screen plate is represented at 21, but the plate 22 is omitted. The collector or target plate 23 of FIG. 1 is replaced by an assembly of resistance strips all connected in series, and arranged behind the holes in the screen plate 21 in a manner shown in detail in FIG. 8. In FIG. 7 this assembly of resistance strips is represented by a resistor 61, one end of which is connected to the positive terminal of the direct current source 28, and the other to the output terminal 35 through the blocking capacitor 36. The electron beam 62 strikes the resistor 61 at some point depending on the hole in the plate 21 through which it passes, as determined by the code combination applied to the deflecting plates of the tube. It will be assumed that the output terminal 35 is connected to a circuit of high or substantially infinite impedance, such as the grid circuit of a valve (not shown). Then it will be clear that if I is the beam current collected by the resistor 61 (assumed to be substantially constant) and R is the resistance between the point at which the beam strikes the resistor and the lower end thereof, the output potential at terminal 35 will be determined by IR. The resistance R has a different value for each hole in the plate 21 and the assembly of resistors can be chosen so that R depends on the signal wave amplitude corresponding to the code combination which selects the hole through which the beam passes.

It will be assumed that the code employed is the ordinary binary code, for which Table I above shows the code combination corresponding to the first sixteen levels for which digits 5 and 6 are both absent. FIG. 8 (which is not drawn to scale) shows 32 similar rectangular resistance strips, of which one is designated 65, arranged in the same plane to from a target assembly which takes the place of the plate 23 in FIG. 1. The strips are arranged in four vertical columns corresponding to the columns of holes in FIG. 3, and each covers two vertically disposed holes in the screen plate 21 (FIG. 1). The small circles in FIG. 8 indicate the areas of the strips which are struck by the electron beam when it passes through the corresponding holes in the screen plate 21.

The small circles will be assumed to be numbered from 1 to 64 in the same way as the corresponding holes in the plate 21 (FIG. 3).

The 32 strips are arranged and connected in four exactly similar groups of eight strips corresponding to the groups of holes marked off by the dotted lines in FIG. 3, and designated A, B, C and D in FIG. 8, reading from the top.

The plate 65 in group B covers the holes Nos. 19 and 23, and its lower end is connected to the positive terminal of the source 28. The upper end of the strip 65 is connected by a conductor of negligible resistance to the lower end of the strip 66 immediately below the strip 65 in the same column, which covers the holes Nos. 27 and 31. The upper end of the strip 66 is connected similarly to the lower end of the strip 67 to the right of strip 65, and the upper end of strip 67 is connected to the lower end of the strip 68 immediately below. The four strips to the left of the strips 65 to 68 are connected together in series in exactly the same way, and the upper end of strip 68 is connected to the lower end of the strip 69 which covers the holes Nos. 17 and 21. The other eight strips in each of the other three groups A, C and D are connected in series according to the same pattern.

The four groups are interconnected in the following manner. The upper end of strip 70 in group B is connected to the lower end of strip 71 in group D. The upper end of strip 72 in group D is connected to the lower end of strip 73 in group A; the upper end of strip 74 in group A is connected to the lower end of strip 75 in group C. Finally the upper end of strip 76 in group C is connected to the output terminal 35 through capacitor 36. It will thus be seen that all the 32 strips are connected in series between the capacitor 36 and source 28.

In order to simplify identifying the resistance strips which have been referred to above, the following Table II gives the numbers of the holes in the plate 21 which they respectively cover:

*Table II*

| Strip No. | Hole Nos. | Strip No. | Hole Nos. |
|---|---|---|---|
| 65 | 19, 23 | 71 | 51, 55 |
| 66 | 27, 31 | 72 | 58, 62 |
| 67 | 20, 24 | 73 | 3, 7 |
| 68 | 28, 32 | 74 | 10, 14 |
| 69 | 17, 21 | 75 | 35, 39 |
| 70 | 26, 30 | 76 | 42, 46 |

The strips should be so designed that the effective resistance between two circular areas on the same strip, or between two successive circular areas on separate strips connected directly together is substantially equal to the same value $r$.

It will be clear from the explanations already given, that when no digit pulses are present (corresponding to level 1), the electron beam strikes the strip 65 on the lower circular area, and for the first 16 levels will strike all the circular areas in group B in turn. The resistance strips are connected in such manner that the resistance between the area struck by the beam and the source 28 increases by $r$ per level, so that it is approximately ½$r$ for level 1 and 15½$r$ for level 16.

Now when the digit 5 pulse is present without the digit 6 pulse, the next 16 levels from 17 to 32 are dealt with by the group D strips, the resistance increasing regularly from 16½$r$ to 31½$r$. When the digit 6 pulse is present without the digit 5 pulse, the next 16 levels from 33 to 48 are dealt with by the group A strips, and the resistance increases regularly from 32½$r$ to 47½$r$. Finally when both digits 5 and 6 pulses are present the last 16 levels from 49 to 64 are dealt with by the group C strips, the resistance increasing regularly from 48½$r$ to 63½$r$.

It will be noted that because a change in the digit 1 pulse corresponds to a change between two consecutive levels it is possible to use one resistance strip for two levels.

By choosing some other form of the binary code it would clearly be possible to arrange for each strip to deal with more than two consecutive levels, so that the number of resistance strips could be reduced. It would, for example, be possible so to arrange the code that only four strips, each dealing with 16 consecutive levels, and corresponding to the four columns of FIG. 8, would be necessary.

Although the embodiments which have been described to illustrate the invention are designed for a binary code, the arrangements are easily adaptable to ternary and other higher degree codes. For example, the modification described with reference to FIG. 5 can be adapted for a six-digit ternary code.

In that case the screen plate 21 will have $3^6=729$ holes, and there will be 729 corresponding grids in the plate 22. Each digit pulse will in this case have three amplitude values, for example, 0, $+v$, and $+2v$. The group of plates 37 to 40 will be designed so that when potentials of $+v$ and $+2v$ are applied to plate 39 or 40 the deflections of the electron beam on the plate 21 will be $d$ and $2d$ respectively, so that this group of plates covers a square group of 9 holes. The other two groups of plates will be designed so that the deflections for $+v$ and $+2v$ are $3d$ and $6d$ for plates 41 to 44 and $9d$ and $18d$ for plates 45 to 48. It will be evident to those skilled in the art that the embodiment of FIG. 1 can be modified in an analogous manner for a ternary code.

It should be mentioned that although for the purpose of illustration, the means described above for deflecting the electron beam in the cathode ray tube comprise systems of deflecting plates, deflecting coils could be used instead, as will be clear to those skilled in the art.

While the principles of the invention have been described above in connection with specific apparatus, it is to be clearly understood that this description is made only by way of example and not as a limitation on the scope of the invention.

What we claim is:

1. A decoding arrangement for an electric pulse modulation communication system employing a digit pulse code having $m$ different code groups to represent $m$ different amplitude levels of a signal wave comprising:
a cathode ray tube including
first means having $m$ apertures therethrough, each representing a different one of said amplitude levels,
second means registered with said first means responsive to the electron beam passing through said apertures to provide a different value of current for each of said apertures, and
a plurality of electron beam deflecting means disposed in coacting pairs equal in number to the number of digits in each of said code groups responsive to the digits of a code group representing any given amplitude for directing said electron beam through one of said apertures corresponding to said given level and
third means coupled to said second means to provide an output voltage representing said given level.

2. An arrangement according to claim 1, wherein said first means includes
a metal screen plate carrying said $m$ apertures; and
said second means includes
a metal collector plate disposed parallel to said screen plate coupled to said third means, and
a perveance plate disposed parallel to and between said collector plate and said screen plate having $m$ metal grid elements each disposed in registry with a corresponding one of said apertures being so dimensioned and biased with respect to said screen plate and said collector plate that said electron beam collected by said collector plate provides said different value of current for each of said apertures.

3. An arrangement according to claim 2, wherein said grid elements each provide a different perveance and are biased by the same potential.

4. An arrangement according to claim 2, wherein said grid elements each have the same perveance and are biased by a different bias potential.

5. An arrangement according to claim 2, wherein
said digit pulse code includes
a binary code having $2n$ digit pulses per code group;
said screen plate includes
$2^{2n}$ holes disposed in a square; and
said coacting pairs of deflecting means are arranged in $n$ groups in tandem, each group comprising two pairs of deflection means to produce deflections at right angles, the odd numbered digit pulses of a code group being coupled to one of said pairs of said deflection means of said $n$ groups of deflection means to deflect said electron beam parallel to one side of said screen plate and the even numbered digit pulses of a code group being coupled to the other of said pairs of deflection means of said $n$ groups of deflection means to produce deflections of said electron beam in a direction perpendicular to the deflection produced by the odd numbered digit pulses.

6. An arrangement according to claim 5, wherein
said binary code includes
$2n-1$ digit pulses per code group;
one of said n groups of deflection means includes only one pair of deflection means; and
said screen plate includes
$2^{(2n-1)}$ holes disposed in a rectangle having $2^n$ holes along one side and $2^{(n-1)}$ holes along the other side.

7. An arrangement according to claim 2, wherein
said screen plate includes
a plurality of groups of apertures, each group comprising sixteen apertures disposed in a square; and
said deflection means responds to the first four digit pulses of a code group to determine the particular one of said apertures of any one of said groups of apertures through which said electron beam will be directed and the remaining digit pulses of the code group to determine which of said groups of apertures will be selected.

8. An arrangement according to claim 7, wherein said screen plate is provided with four groups of sixteen holes each arranged in a rectangle.

9. An arrangement according to claim 1, wherein said first means includes
a metal screen plate carrying said $m$ apertures; and said second means includes
a resistor device including a plurality of resistive strips disposed in a plane parallel to said screen plate, said resistive strip being connected in series between said third means and the direct current source used to generate said electron beam, said resistive strips being in registry with at least one of said apertures to produce an output voltage at said third means having a potential proportional to the number of said strips the beam current flows through.

10. An arrangement according to claim 9, wherein $m$ is even; and
said resistor device includes
$m/2$ similar resistance strips disposed in registry with two adjacent apertures in said screen plate.

11. An arrangement according to claim 1, wherein said plurality of deflecting means includes
a first group of deflecting plates including
a first elongated deflection plate having a given orientation,
a first pair of shorter deflection plates disposed in the same plane spaced from and parallel to said first elongated deflection plate and coextensive thereto,
a second elongated deflection plate having an orientation orthogonally related to said given orientation and coextensive with said first elongated deflection plate,
a second pair of shorter deflection plates disposed in the same plane spaced from and parallel to said second elongated deflection plate and coextensive thereto; and
a second group of deflection plates including
a third elongated deflection plate disposed between said first group and said first means, and
a third pair of shorter deflection plates disposed in the same plane spaced from and parallel to said third elongated deflection plate;
each of said elongated deflection plates being responsive to selected different ones of the digits of a code group and one of the shorter electrodes of each of said pair of shorter electrodes being responsive to different ones of the other digits of a code group, the other shorter electrodes of each of said pairs of shorter electrodes being coupled to a common potential.

12. An arrangement according to claim 1, wherein said plurality of deflecting means includes
three groups of deflecting plates, each of said groups including two pairs of coacting deflecting plates, one pair deflecting said electron beam in one direction and the other pair deflecting said electron beam in a direction orthogonally related to said one direction
one plate of each of said pairs of plates in each of said groups of plates being coupled to a common potential and the other plate of each of said pairs of plates in each of said groups of plates being responsive to a different one of the digits of a code group; and
means to couple a biasing potential to said other plates of said pairs of plates in one of said groups to determine the rest position of said electron beam.

References Cited in the file of this patent

UNITED STATES PATENTS

| | | |
|---|---|---|
| 2,602,158 | Carbrey | July 1, 1952 |
| 2,632,147 | Mohr | Mar. 17, 1953 |
| 2,643,289 | Sziklai | June 23, 1953 |
| 2,689,314 | Gunderson | Sept. 14, 1954 |
| 2,696,555 | Herring | Dec. 7, 1954 |
| 2,812,133 | McMillan | Nov. 5, 1957 |
| 2,829,302 | Tatham | Apr. 1, 1958 |
| 2,830,285 | Davis | Apr. 8, 1958 |
| 2,840,637 | McNaney | June 24, 1958 |
| 2,855,539 | Hoover | Oct. 7, 1958 |
| 2,867,797 | Greene | Jan. 6, 1959 |
| 2,884,195 | Doll | Apr. 28, 1959 |
| 2,999,178 | Cash et al. | Sept. 5, 1961 |

OTHER REFERENCES

IBM Technical Disclosure, Bulletin, Vol. No. 4, page 20.

IRE Transactions on Instrumentation, March 1958, pp. 29–37.